Feb. 19, 1957

A. A. ESPARI ET AL 2,781,573

ROD-SAWING MACHINE

Filed May 13, 1954

INVENTORS
A. A. Espari
L. J. Paffumi
BY Rockwell & Bartholow
ATTORNEYS

Feb. 19, 1957  A. A. ESPARI ET AL  2,781,573
ROD-SAWING MACHINE
Filed May 13, 1954  5 Sheets-Sheet 2
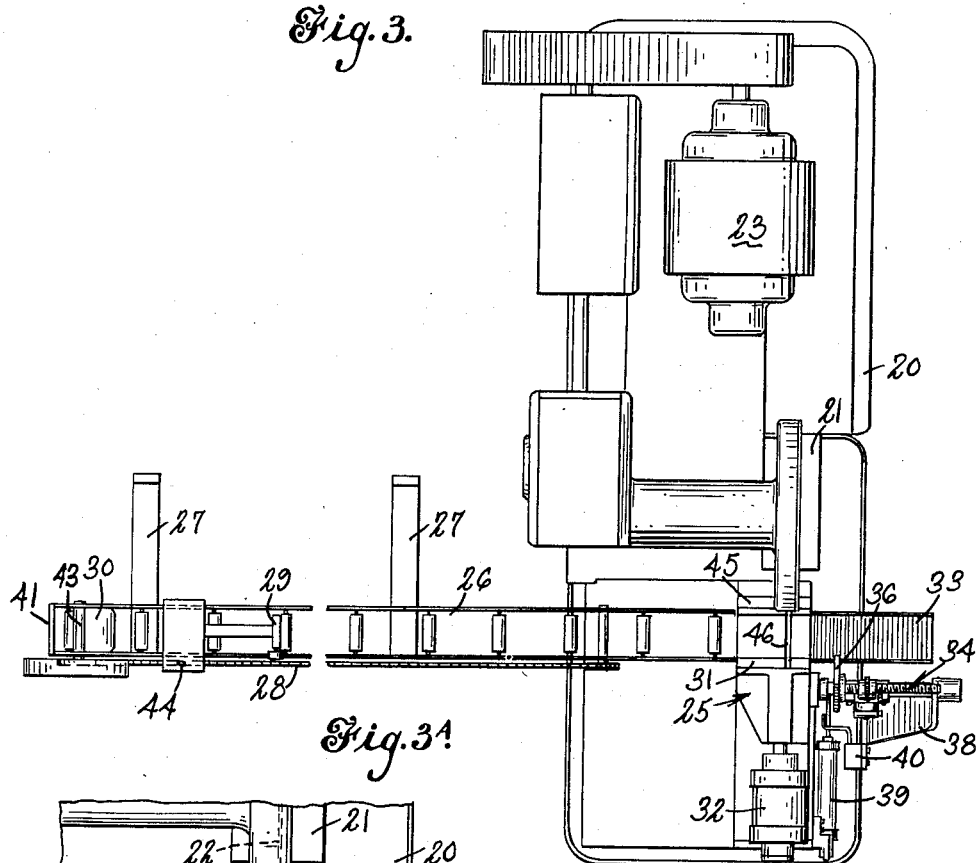
Fig. 3.
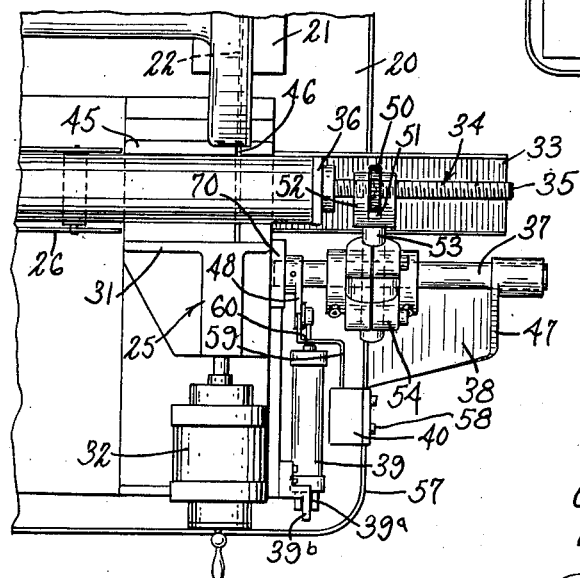
Fig. 3ᵃ
INVENTORS
A. A. Espari
L. J. Paffumi
BY
ATTORNEYS

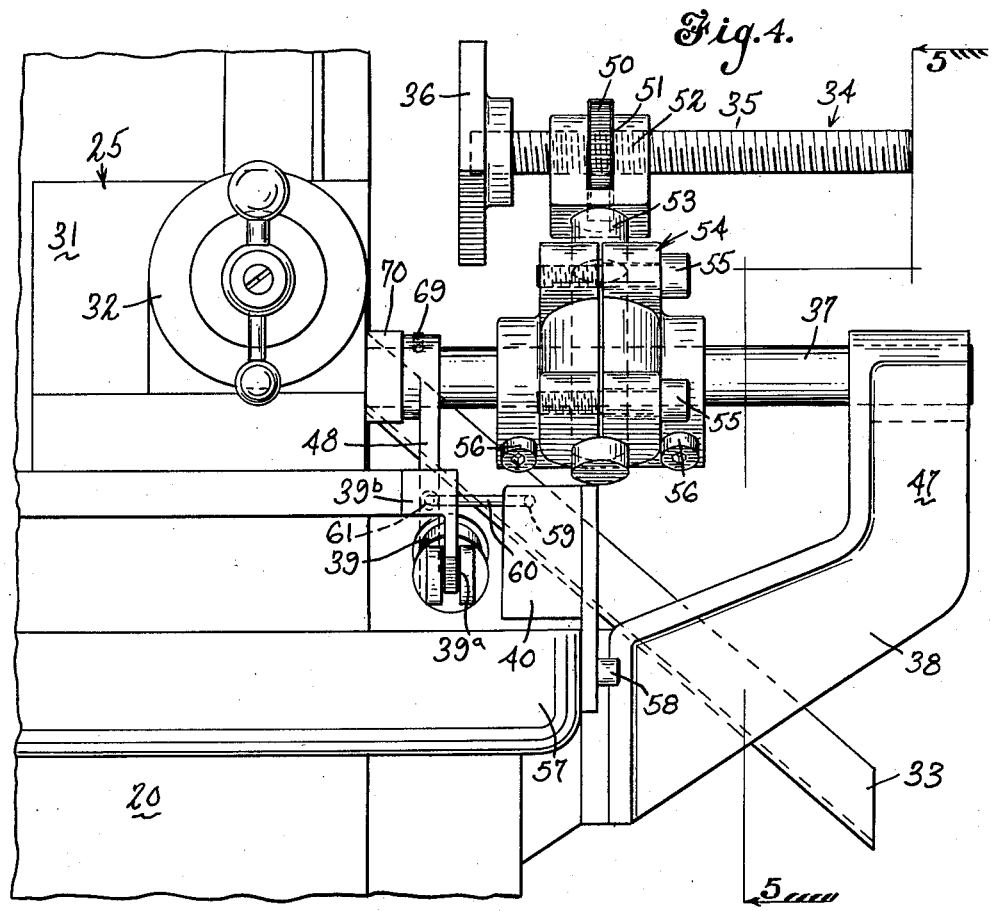
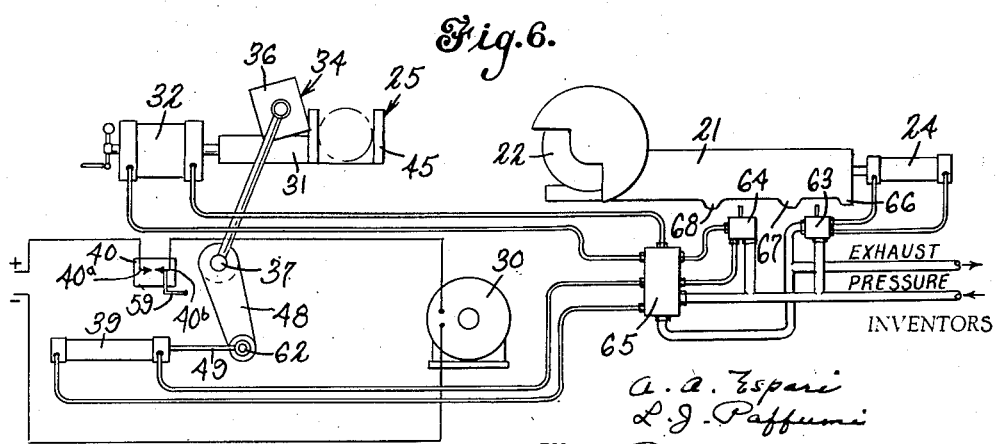

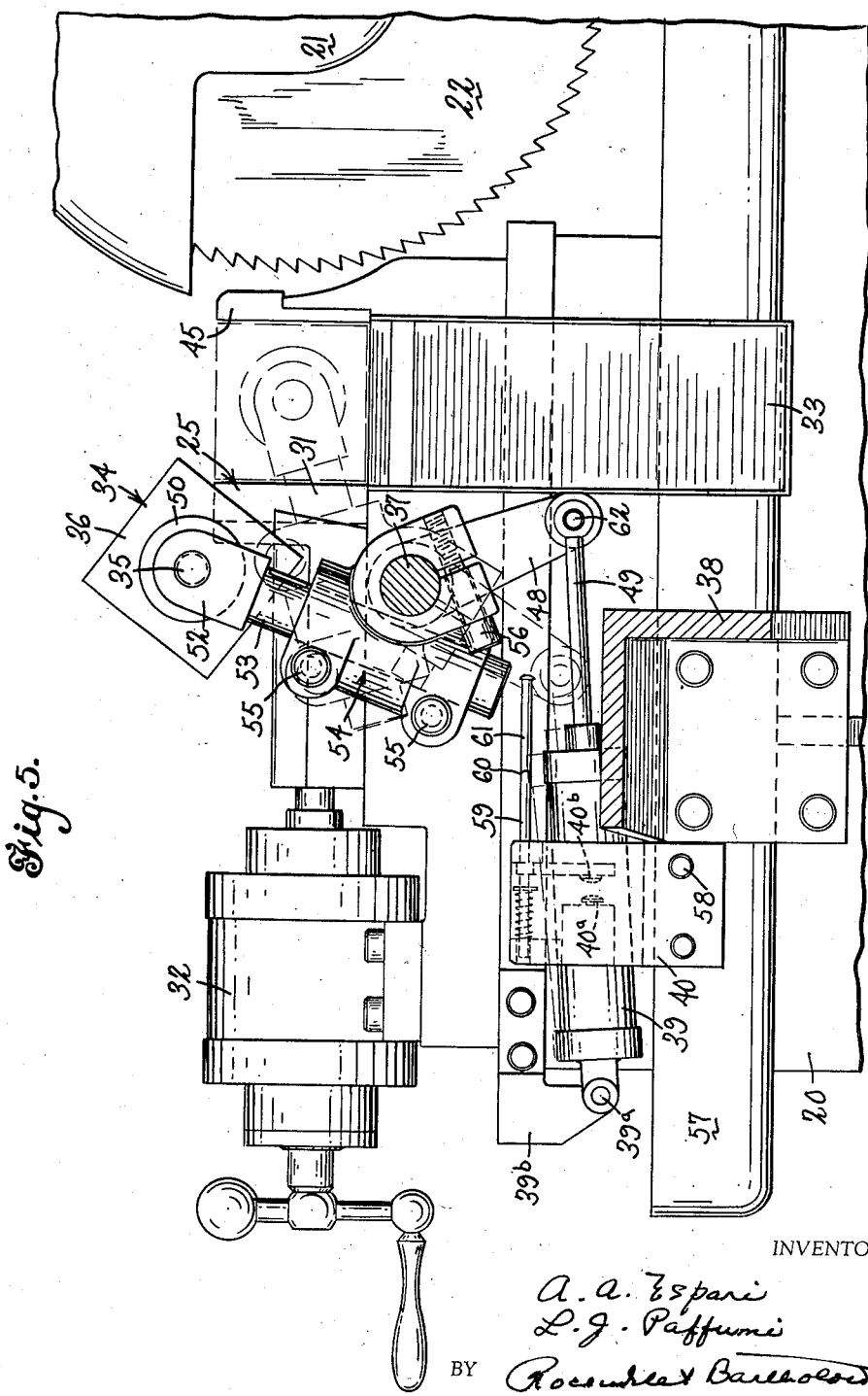

United States Patent Office 2,781,573
Patented Feb. 19, 1957

2,781,573
ROD-SAWING MACHINE

Alphonse A. Espari, Hamden, and Louis J. Paffumi, New Haven, Conn., assignors to Interstate Manufacturing Corporation, Orange, Conn., a corporation of Connecticut Application May 13, 1954, Serial No. 429,538

1 Claim. (Cl. 29—69)

This invention relates to cold-metal sawing machines of the type in which relatively long rods or bars are sawed into a number of short pieces, the work being fed forwardly to the saw in a stepwise manner.

The machine is of a type in which a rotary saw is mounted for movement toward and away from the work in a lateral direction, the workpiece being held stationary in a clamp or vise while the saw is cutting, the workpiece being released after the completion of the cut and being fed forwardly again for another cutting operation.

The invention is particularly concerned with the means causing the forward feed of the workpiece to be stopped at the proper point and enabling the cut-off piece to be discharged from the machine, and to the coordination of this part of the mechanism with the other parts of the machine.

An object of the invention is to provide an improved machine having a fluid-pressure-operated stop member or gauging member which is movable in a lateral direction for the purpose of engaging and disengaging the forward end of the workpiece, said member, when moved into the path of the workpiece, serving with other elements of the machine to stop the workpiece at the proper point for cutting, and the movement of said member into and out of the path of the workpiece serving to control the feed of the workpiece by the workpiece feeding means.

Another object of the invention is to provide a machine having a pivoted stop member mounted and operating in a novel and beneficial manner.

Another object is to provide improved coordination between the stop member and the other elements of the machine.

Another object is to provide a rod-sawing machine embodying a hydraulically shiftable stop or gauging member employed in a novel manner in conjunction with hydraulic means for effecting movement of the carriage, and hydraulic means operating a member of the work-holding clamp or vise.

In the drawings:

Fig. 3 is a top plan view of the machine with the parts in the position shown in Fig. 2;

Fig. 3A is a fragmentary view on a larger scale of the parts shown in Fig. 3, the workpiece being clamped in position preparatory to cutting;

Fig. 4 is a fragmentary view showing in side elevation and on a larger scale certain parts illustrated in Fig. 3A, the stop member being in the inoperative position;

Fig. 5 is a sectional view taken on line 5—5 of Fig. 4;

Figure 1:
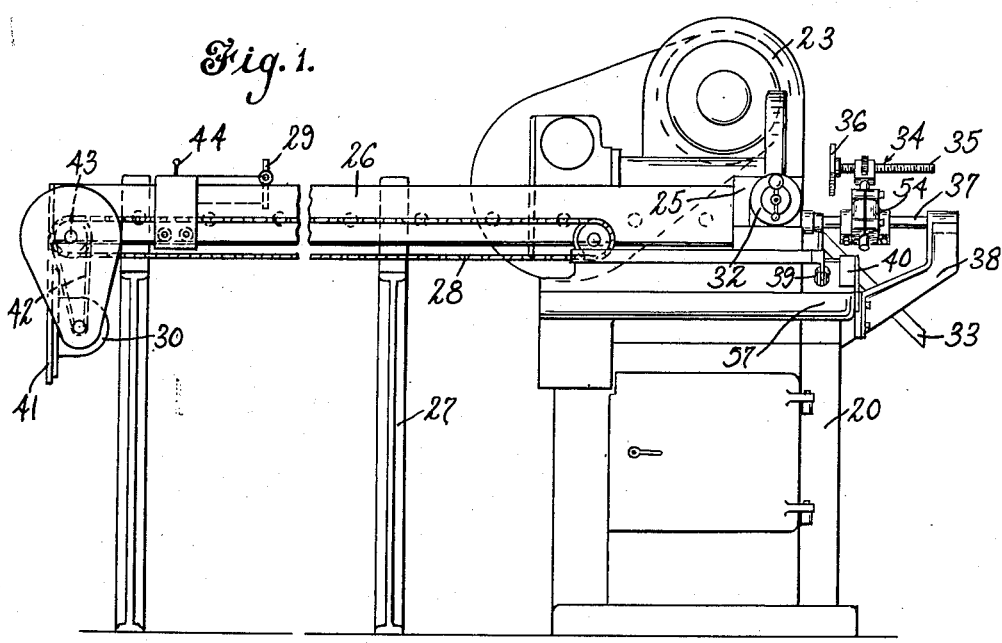
Fig. 1 is a side elevation, partly broken away, of a rod-sawing machine embodying the invention.
Figure 2:
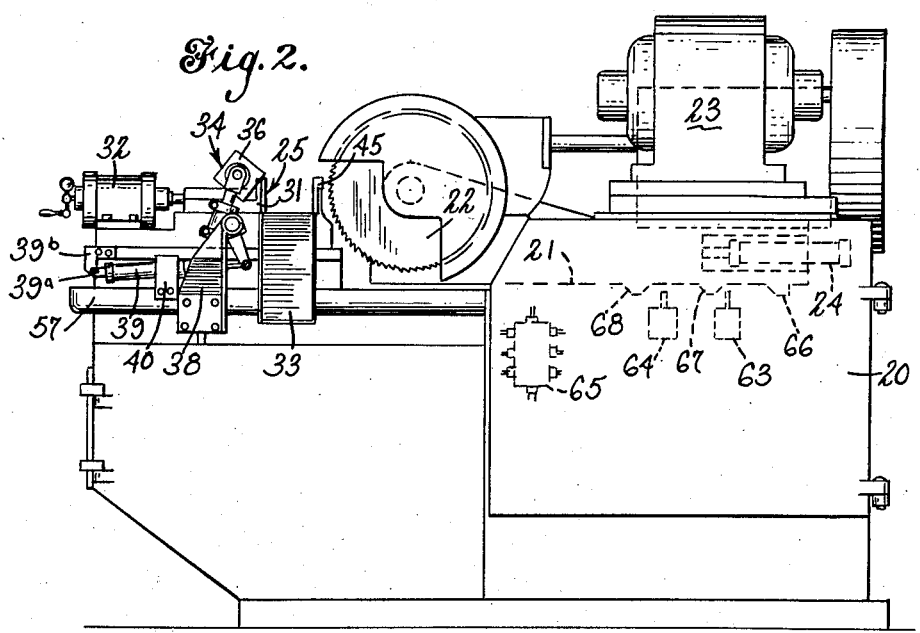
Fig. 2 is a front view of the machine showing the work clamp open and the stop member out of the path of the work.
Figure 7:
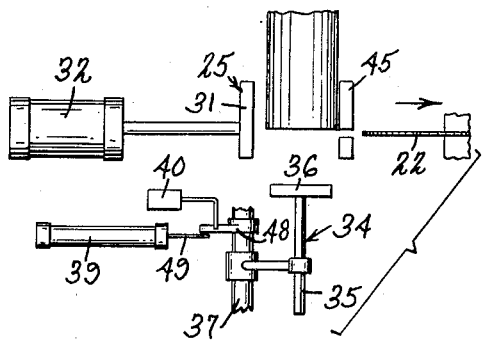
Figure 8:
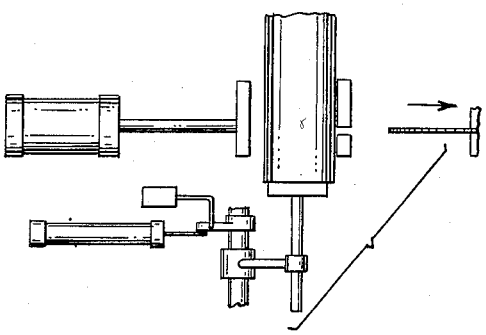
Figure 9:
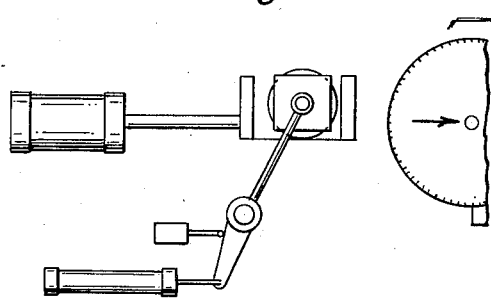
Figure 10:
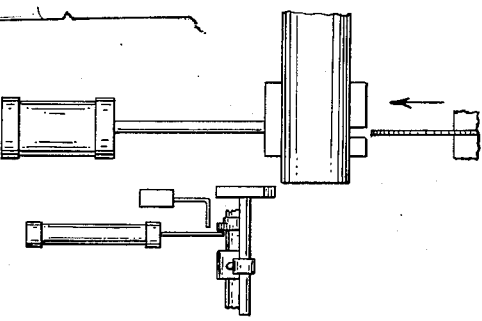
Figure 11:
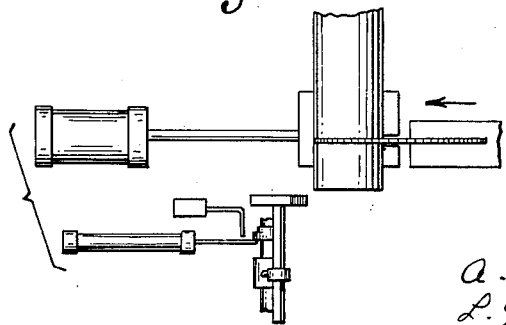

Fig. 6 is a diagrammatic view showing the principal elements of the machine, the stop member being in the inoperative position and the saw carriage being in the retracted position; and Figs. 7 to 11, inclusive, are diagrammatic illustrative views showing different stages in the operation of the machine, all of these views illustrating the parts in plan, except Fig. 9, which is an elevation corresponding to the showing of Fig. 8.

The machine shown in the drawings by way of example is one in which the carriage for the rotary saw is reciprocably mounted on the machine frame, the arrangement being such that the saw blade can be advanced through the end portion of a heavy rod or bar which is fed forwardly at right angles to the direction of feed of the saw blade. The saw blade is rotated by an electric motor in a manner known in the art and the saw carriage is advanced and retracted in this instance by a hydraulic cylinder and piston. The workpiece is held in a vise or clamp having a fixed jaw and a movable jaw, the movable jaw being operable by a hydraulic cylinder and piston. The rod to be sawed extends rearwardly from the main part of the machine and is supported on a raised track or framework having supporting rollers for the rod, the framework being equipped with an endless feed chain and with a pusher attached to the chain which engages the rear end of the rod so that it can be fed forwardly by the movement of the chain, such movement being produced by an electrical torque motor. The torque motor advances toward the saw the upper run of the endless feed chain so that, through the pusher attached to this upper run, the workpiece is fed forwardly at the correct speed. The feed stop mechanism involves a pivoted laterally movable stop member swingable in a vertical plane directed transversely of the workpiece and having a rear end equipped with a plate or pad which in one position is engageable by the forward end of a workpiece placed in the work clamp and in another position is out of said path so as to enable the discharge of the piece which has been cut off. The stop being removed from the path of the cut-off piece, the latter can move down a discharge chute to be discharged from the machine. The pivoted stop member is operable by a hydraulic cylinder and piston which is operable to swing the stop member to and from the operative position. The stop member movable to and from the operative position is provided with means for operating an electrical contact device adapted to open and close the circuit of the torque motor so that the motor will be started and stopped automatically, as hereinafter described.

In the drawings, the machine frame at the saw-carrying portion of the machine is indicated at 20, the saw carriage at 21, the rotary saw at 22, the electric motor for rotating the saw at 23, the hydraulic cylinder for shifting the saw carriage at 24, the clamp for holding the workpiece at 25, the elevated track for supporting the workpiece at 26, this being mounted on suitable standards 27, the feed chain at 28, the pusher acting upon the rear end of the workpiece at 29, and the torque motor for operating the feed chain at 30.

The movable jaw of the work holder is indicated at 31, this being shiftable to and from clamping positions by a hydraulic cylinder and piston 32, the movable clamp jaw being at the side of the workpiece path opposite the saw carriage, and the clamp having associated therewith a forwardly and downwardly inclined discharge chute 33. The pivoted feed stop member previously mentioned is indicated generally at 34, the same including a threaded stem or shank 35 having at the rear end a plate or pad 36 movable transversely of the workpiece path and located somewhat forwardly of the forward end of the clamp, as shown in Figs. 3 and 3A. This swingably mounted stop member is pivotally mounted from a rocking rod or shaft 37 supported in part by a bracket 38 extending forwardly from the machine frame. The hydraulic cylinder device for moving the stop member 34 to and from operative position is indicated at 39. The electrical contact device controlled by movement of the stop member and adapted to open and close the power circuit supplying the torque motor is indicated at 40, this being located on the forward part of the machine frame adjacent the hydraulic cylinder device 39.

The torque motor 30 is supported on a bracket 41 depending from the rear end portion of the feed track, and has a chain connection 42 with the rear shaft 43 of the feed chain so that the upper run of the feed chain 28 can be moved forwardly to advance the rod toward the cutting zone of the saw. The pusher 29 can be connected to and disconnected from the upper run of the feed chain by a manually operable connector of suitable structure having a manipulating handle 44. The means for rotating the saw at the desired speed from the motor 23 may be of a well-known kind which it is not necessary to illustrate.

The fixed jaw of the work clamp 25 is indicated at 45 and in the lower portion of this jaw is a slot 46 affording clearance for the teeth of the saw.

Referring now to the detail structure of the pivotally mounted stop member 35, 36, it will be noted that the rod or shaft 37, as shown in Figs. 3A and 4, has its rear end turnable in the machine frame forwardly of the traversely slidable clamp jaw 31, while the forward end of the rod is turnable in a vertical part 47 of the bracket 38. Fixed to and depending from the rockable shaft 37 closely adjacent the machine frame is an operating arm 48, the lower end of which is pivotally connected to the piston 49 of the hydraulic cylinder device 39. By this means, the hydraulic device 39 is operable to rock the rock shaft in opposite directions.

The hydraulic cylinder, at the end opposite its connecting rod, is pivoted at 39a to a bracket 39b mounted on the machine frame so that the cylinder can have the necessary pivotal movement as the position of the operating arm 48 is changed. The stop stem 35 is threaded throughout its length, as shown in Fig. 4, and the threads are engaged by a knurled round nut 50 accommodated in a notch 51 in a block 52 having opposite clearance openings for the stem 35, the arrangement being such that the nut is held against longitudinal movement so that, depending upon the direction of its rotation, the pad carried by the end of the stem is moved longitudinally in one direction or the other.

The block 52 through which the stop stem 35 is passed is fixedly supported at the upper end of a supporting arm 53 in the form of a rod mounted in fixed position with respect to the rock shaft 37 by means of a socketed fitting generally indicated at 54. This fitting has a socket in which the upwardly inclined arm 53 (Fig. 5) is adjustable, and another socket accommodating the horizontal rock shaft. The first-mentioned socket is split in an up-and-down direction (Fig. 4) and has upper and lower clamping screws 55, and the second-mentioned socket is split lengthwise of the shaft 37 (Fig. 5) and has laterally spaced screws 56 which, when tightened, clamp the entire fitting in the desired position on the rock shaft. In this manner, the adjustment of the fitting and the stop stem carried thereby along the rock shaft to the desired location is provided for, and also a certain amount of up-and-down adjustment for the stop member. By these adjustments, there is considerable latitude in adapting the machine to stock of different diameters, cut-off pieces of different lengths, and other variable conditions. It is understood that the supporting arm 53 is mounted from the rock shaft for swinging in a vertical plane directed transversely of the machine, and that the stop stem is bodily movable with and by the upper end of this arm to change the location of the stem relatively to the work holder.

The electrical contact device 40 is positioned adjacent an upstanding flange 57 adjacent the forward face of the machine frame, this flange being the same part to which the base portion of the bracket 38 is fastened, and, as viewed in Fig. 5, said contact device is arranged at one side of the bracket, being fastened to the flange by suitable fastening members 58 and having a body portion extending upwardly from the flange in front of the hydraulic cylinder 39. The body portion of the contact device 40 contains a fixed contact 40a and a laterally slidable cooperating contact 40b, the slidable contact being operable by a slide rod 59 projecting laterally from the casing of the contact device in the direction of the depending arm 48 on the rock shaft. The form of the sliding contact-operating member 59 in plan is as shown in Fig. 3A, the same being, in this example, a rod-like member extending out of the casing of the contact device and having intermediate of its ends an offset portion 60 and extending from the offset portion integrally therewith a portion 61 located in the same vertical plane as the rock arm 48. The free end of the fingerlike portion 61 is adapted to be contacted by an edge of the rock arm 48 so as to slide the rod 59 to an extent such that its associated contact 40b will make contact with the fixed contact 40a for the purpose of closing the circuit of the torque motor, as hereinafter described. Associated with the rod 59 is a spring which serves to keep the contacts 40a and 40b out of contact with each other normally, but upon movement of rocker arm 48 in one direction, as hereinafter described, the motor circuit is closed.

The piston 49 of hydraulic cylinder 39 is pivotally connected to the lower end of rocker arm 48 at 62, as shown in Fig. 5. In this view, the stop pad 36 of the stop stem is shown in full lines in the inoperative position in which it is out of the path of the workpiece, and the rock arm 48 and members 49 and 39 are in corresponding positions. However, upon operation of the hydraulic cylinder 39, the pad is moved to the position shown in broken lines, where it will be in a position to arrest the workpiece in the work holder. In moving to this position, the rock arm 48 contacts the rod end 61 in a manner to close the motor circuit.

In Fig. 6, the principal parts of the machine are shown, including those which have just been described, but in this view the showing is diagrammatic rather than structural. Among other things, the saw carriage 21 and its shifting hydraulic device 24 are shown, with suitable hydraulic connections of this hydraulic device to a pressure source and to exhaust, respectively, and to the hydraulic cylinder 39 associated with the swinging stop member and to the hydraulic cylinder 32 associated with the work-holding clamp. In the hydraulic system shown here, suitable control valves are included which are of known structure and are not disclosed in detail. The control devices include a valve 63 for controlling the hydraulic cylinder 24 connected to the pressure source and to the exhaust, and also a similar valve 64 connected to a distributing valve 65 which is a valve for controlling both the operation of hydraulic 39 and that of hydraulic 32. The valves 63 and 64 previously mentioned are adapted to be shifted in a known manner by actuating lugs 66, 67 and 68 on the saw carriage 21 so that these valves are opened and closed at the proper points in the travel of the saw carriage. This diagram also includes the torque motor 30 and shows the contact device 40 operative by shifting of the rocker arm 48, which is moved on its pivot as the stop device 34 is swung between operative and inoperative positions.

Referring to Fig. 6, it will be noted that the actuating lug 66 is at the rear end of the saw carriage (with respect to the saw) and that the actuating member of the valve 63 is moved in one sense or direction by the lug 66 on the movement of the saw toward the work, whereas, on the withdrawal of the carriage, the lug 67 actuates the valve. It will also be noted that the valve 64 is located between the lugs 67 and 68 so as to be actuated on the advance and retraction of the carriage. The valve 64 controls the admission and withdrawal of fluid for the hydraulic cylinder for the work clamp, and for the cylinder of the hydraulic 39, this being effected through the distributing valve 65 that controls the leads to the first-named cylinder and the leads to the second-named cylinder shown in Fig. 6.

The above-described structure of the swinging workpiece stop and its mounting or supporting means provides a stop member which is strong and rigid and when impinged by the end of the workpiece strongly resists further advance movement of the latter, notwithstanding the application of considerable pressure against the workpiece by the electric-motor-operated feeding means. The stop member 35, 36 is so strongly supported that in operation of the machine there is minimum play when pressure is applied to the pad of the stop member. The distance from the rock shaft to the axis of the stop stem 35 is relatively short so that the bending moment is reduced and, as above explained, the support for the stop member from the rock shaft and the fixture connecting it to the rock shaft is very strong and rugged. Moreover, as above pointed out, the stop member is very readily adjustable with respect to the rock shaft. The rock arm 48 is also readily adjustable with respect to the rock shaft inasmuch as an adjusting screw or like member 69 may be used for clamping said arm to the rock shaft. The outboard bracket 38 together with the inner bearing (indicated at 70) for the inner end of the rock shaft provides a very strong support for this shaft and this shaft may be of the requisite length to permit the desired lengthwise adjustment of the stop stem with respect to the work clamp.

In the operation of the machine, the movement of the saw carriage controls the supply and exhaust of pressure fluid to and from the work-clamp cylinder and to and from the stop-shifting hydraulic through the connections above described, and the movement of the stop by its hydraulic actuator controls the operation of the torque motor which feeds the stock by starting and stopping this motor at the proper points in the cycle. When the saw carriage is being returned toward the work, the stop member is moved out of the path of the stock length or workpiece by actuation of the hydraulic 39, and, at a certain point in the movement of the rock arm 48, the contact device 40 is operated to open the circuit of the electric motor so that at the proper time this motor will cease to feed the workpiece forwardly.

The diagrams, Figs. 7 to 11, show different stages in the operation of the machine. Fig. 7 show a step closely following the step shown in Fig. 11. In the latter figure, the workpiece is firmly held in the clamp and the saw has practically completed the sawing-off of a piece of rod. Still referring to Fig. 11, the stop pad 35 has already been moved laterally out of the feed path so that when the cut is completed and the clamp is released the cut-off piece, which overhangs the discharge chute, will move by gravity down the chute.

Now as to Fig. 7, the clamp is in the released position and the stop pad 35 has been moved back into alignment with the clamp, and the saw has started its withdrawing movement. The stop pad being in the operative position, as mentioned, the motor circuit is held closed by the contact device 40 and the feed of the workpiece is resumed to bring the workpiece against the stop member, the condition then being that indicated in Figs. 8 and 9. The next stage shown is that of Fig. 10, where the saw is on its advance movement. The work clamp has closed and the stop member has moved back to the inoperative position, thereby arresting the feed of the work, and all is ready for the saw cut. The next step is then that shown in Fig. 11, where the sawing cut is nearly complete, as above described.

It will be seen from the foregoing that there is provided a machine characterized by an improved stop arrangement in which a stop member, swingable in a vertical plane transversely of the path of the workpiece, is employed; also that this stop member has simple and effective connections whereby it is operable by power. It will also be apparent that this stop member has effective connections whereby the feeding movement of the workpiece is commenced and arrested at the proper points in the cycle. It will also be apparent that the present machine is an organized machine having comparatively simple effective controls coordinated in order to secure very advantageous results. The feed of the workpiece is provided through an electric motor, as above described, the operation of which is started and stopped from the power movement of a pivoted stop in connection with whose mounting there is employed a stop-shifting element which is hydraulically operated and whose movement causes the operation of a switch in the motor circuit. These features are used, moreover, in a relatively simple layout wherein the saw carriage is shiftable by a hydraulic or like fluid-pressure member and by its lengthwise movement controls the operation of the hydraulic which shifts the stop and the hydraulic which opens and closes the work clamp. The installation as described is relatively simple and the provisions for gauging the stock cut and for controlling feed of the stock are substantially improved in comparison to those used in prior machines. Obviously the machine can be used for sawing hollow members as well as solid ones, and the stock being operated upon need not be of round cross section as in the case illustrated.

In practice the actuating lugs or dogs carried by the saw carriage will be adjustable relatively to the latter, but as this in itself is not a new feature the means for adjustment is not shown.

The present disclosure is by way of example only and various modifications and changes in the details may be made without departure from the principles of the invention and the scope of the claim.

What we claim is:

In a rod-sawing machine, a bed, a saw carriage on the bed and reciprocable thereon, a work-holding clamp on the bed and toward which said carriage is movable, said clamp having a movable jaw, means for feeding the work toward said clamp transversely of the path of the carriage, said means including a prime mover, a movable stop member having a work-engaging stop portion movable into the path of the work for stopping and blocking the work against the pressure of the feeding means, the stop portion being movable out of said work path to permit discharge of the cut off piece, means controlled by the movement of said stop portion for rendering said prime mover inoperative when said stop portion is in the inoperative position and operative when the stop portion is in the work-blocking position thereof, power-operated means for actuating said stop member, power-operated means for actuating said movable jaw of the clamp, and power-operated means for actuating said saw carriage, each power-operated means being controlled in timed relationship by movement of said carriage.

References Cited in the file of this patent

UNITED STATES PATENTS

| 1,840,684 | Welch | Jan. 12, 1932 |
| 1,930,295 | Von Henke | Oct. 10, 1933 |
| 2,327,920 | Moohl | Aug. 24, 1943 |
| 2,351,962 | Harrison | June 20, 1944 |
| 2,617,176 | McClellan et al. | Nov. 11, 1952 |
| 2,633,625 | Romans et al. | Apr. 7, 1953 |

FOREIGN PATENTS

| 463,312 | Great Britain | Mar. 19, 1937 |